No. 857,921. PATENTED JUNE 25, 1907.
J. W. BRADFORD.
NESTING AND BROODING BOX.
APPLICATION FILED MAR. 27, 1907.
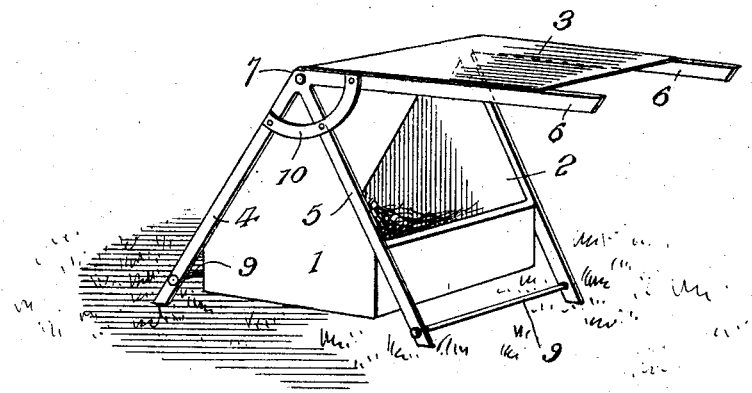
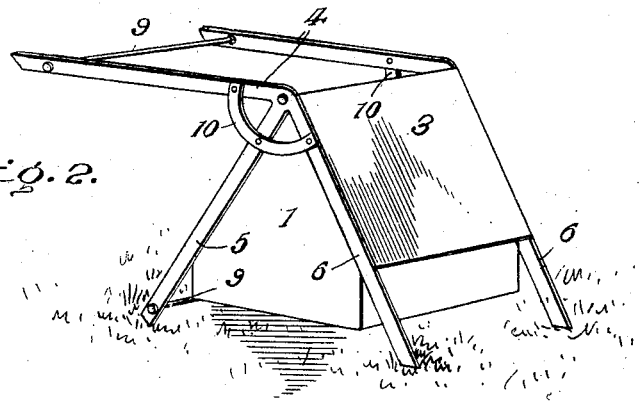
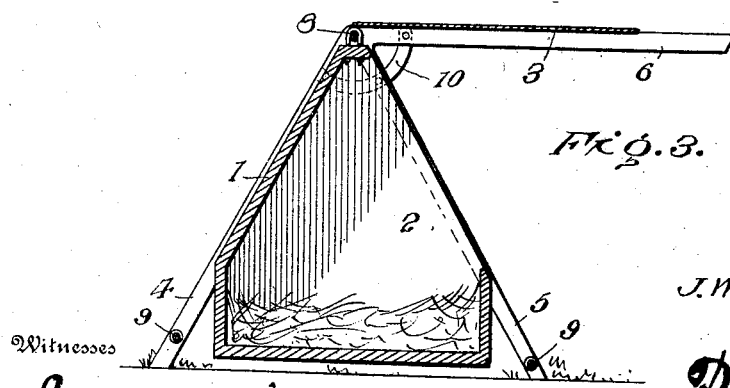
Inventor
J. W. Bradford,
Witnesses
Attorneys
THE NORRIS PETERS CO., WASHINGTON, D. C.

UNITED STATES PATENT OFFICE.

JOSEPH W. BRADFORD, OF STRAWS MILL, TEXAS.

NESTING AND BROODING BOX.

No. 857,921.      Specification of Letters Patent.      Patented June 25, 1907.

Application filed March 27, 1907. Serial No. 364,878.

*To all whom it may concern:*

Be it known that I, JOSEPH W. BRADFORD, a citizen of the United States, residing at Straws Mill, in the county of Coryell and State of Texas, have invented certain new and useful Improvements in Nesting and Brooding Boxes, of which the following is a specification.

The present invention relates in general to poultry culture and more particularly to a novel form of nesting and brooding box, the object being to provide a device of this character which can be readily transported from place to place and which is extremely simple in its construction and can be readily kept free from all vermin such as mites and lice.

A further object of the invention is to so design the nesting and brooding box as to provide the desired protection for young fowls when used as a brooder, and so that it will be secure against dogs, snakes and the like which might molest the poultry at night.

For a full description of the invention and the merits thereof and also to acquire a knowledge of the details of construction and the means for effecting the result, reference is to be had to the following description and accompanying drawings, in which:

Figure 1 is a perspective view of the brooding and nesting box, showing the same in an open position. Fig. 2 is a similar view of the box when in a closed position. Fig. 3 is a transverse sectional view.

Corresponding and like parts are referred to in the following description and indicated in all the views of the drawings by the same reference characters.

In general the invention comprises the box 1 which has an open side 2 through which access can be readily had to and from the interior of the box, and which is pivotally mounted upon a rocking frame, the said rocking frame carrying a cover 3 which closes the opening 2 at one position of the frame and leaves the said opening unobstructed at the other position of the frame. This rocking frame comprises a pair of corresponding end pieces, each of which is formed with a series of arms 4, 5 and 6 radiating from a given point or apex 7. Connecting the two apex portions of the opposite end pieces is the rod 8 from which the box 1 is loosely suspended.

The corresponding arms 4 and 5 upon the two end pieces are connected in a similar manner by means of the cross pieces or rungs 9, while the arms 6 are connected by the cover 3. If found desirable the arms of each side piece may be reinforced by means of the brace members 10.

When the rocking frame is supported by the arms 4 and 5 of the two end pieces as shown in Fig. 1, the arms 6 and the cover 3 carried thereby are in an approximately horizontal position and leave the entrance 2 leading into the box 1 unobstructed. By grasping one of the rungs 9 however the rocking frame may be tilted into the position shown in Fig. 2 where it is supported upon the arms 5 and 6 and the cover 3 fits over and tightly closes the entrance 2. In this position the arms 4 have an approximately horizontal position and form a convenient handle for again tilting the frame into the open position shown in Fig. 1 when found desirable. In the formation of the nesting and brooding box 1 the bottom or lower square part of the same may be slatted if found desirable in order to provide suitable ventilation.

Having thus described the invention, what is claimed as new is:

1. In a device of the character described, the combination of a movable frame, a box carried by the movable frame, and a cover also carried by the movable frame and designed to close the box at one position of the said frame.

2. In a device of the character described, the combination of a movable frame comprising a pair of end pieces formed with corresponding radiating arms, a box loosely suspended from the movable frame, and a cover carried by the movable frame and designed to close the box at one position of the same.

3. In a device of the character described, the combination of a movable frame comprising a pair of end pieces formed with corresponding radiating arms, a cover carried by one pair of the radiating arms, and a box loosely suspended from the movable frame, the cover being designed to close the entrance to the box at one position of the movable frame.

4. In a device of the character described, the combination of a pair of end pieces each of which is formed with a series of arms radiating from an apex, a rod connecting the apex portions of the two end pieces, a cover connecting one pair of corresponding arms, and a box loosely suspended from the before mentioned rod and formed with an entrance designed to be closed by the cover when the end pieces are rocked into a predetermined position.

In testimony whereof I affix my signature in presence of two witnesses.

JOSEPH W. BRADFORD. [L. S.]

Witnesses:
A. S. BEBOUT,
A. B. BENNETT.